Aug. 3, 1971 J. HUMPAGE ET AL 3,597,335

METHOD FOR MANUFACTURING LOGICAL DEVICES

Filed Dec. 15, 1967

3,597,335
METHOD FOR MANUFACTURING LOGICAL DEVICES

John Humpage and David C. Stapleton, Ilford, England, assignors to The Plessey Company Limited, Ilford, England Filed Dec. 15, 1967, Ser. No. 690,963
Claims priority, application Great Britain, Dec. 24, 1966, 57,867/66
Int. Cl. C23b *5/58, 5/32;* B01k *3/00*
U.S. Cl. 204—28 7 Claims

ABSTRACT OF THE DISCLOSURE

A method of depositing a thin magnetic layer on a wire for constructing a logical device such as a memory matrix. The method comprises electrodepositing the layer in a continuous process under conditions which give a uniform deposit and it may employ a superimposed alternating current to give a preferred direction of magnetisation in the deposited layer.

Figure 1:
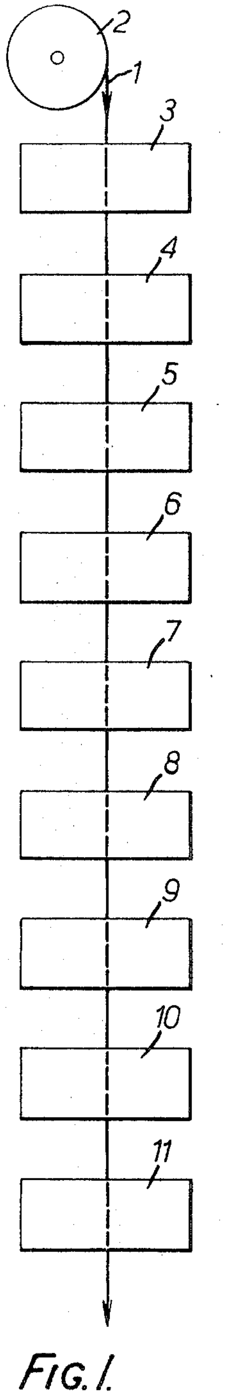

This invention relates to methods and apparatus for manufacturing logical devices. More particularly the invention relates to methods and apparatus for manufacturing logical devices which comprise elongated substrates incorporating a conductive path therealong, on which are provided, by electrodeposition, thin film coatings utilisable as storage elements.

It has been proposed to employ in a magnetic data storage device an electrically conductive wire which has deposited thereon a thin film cylindrical coating of ferromagnetic alloy material. Preferably the coating is formed by a continuous process in which the wire is continuously fed through a plating bath in which the ferromagnetic material is deposited by electrodeposition. A thin film magnetic alloy coating for use in a magnetic data storage device should have certain characteristics for effective operation. One of these characteristics is that the coating should exhibit uniaxial anisotropy, i.e. it should have a preferred direction of magnetisation, usually termed its "easy axis" of magnetisation. This direction may be arranged to lie in a circumferential direction of the cylindrical coating which is at right angles to the axis of the wire, or may be arranged to lie in the direction of said axis of the wire, or may have components in both said directions. Thus in the direction of the easy axis the thin film magnetic coating has a hysteresis loop which is square with two stable remanent states of magnetisation which are used to represent the digits "1" and "0" of a binary code. On the other hand in the direction at right angles to the easy axis the hysteresis loop is such that an applied magnetic field causes the magnetisation of the thin film magnetic coating to follow said applied field by an essentially rotational process.

In one method of operating a magnetic data storage device incorporating thin magnetic film coatings on conductive wires, a two-conductor selection system is employed, in which the wire forming the substrate for the thin film is used as a first selection conductor, and the second selection conductor is a winding disposed orthogonally to said first conductor, and may, for example, be in the form of a relatively broad strip. If the easy axis of the thin film coating is in the circumferential direction thereof at right angles to the axis of the wire substrate, then said wire substrate or first conductor is employed as the digit selection conductor, and said second conductor is employed as the word selection conductor. An impulse in the word selection conductor produces a magnetic field in the axial direction of the wire substrate which causes the magnetisation of the element of the thin film coating associated with said first and second conductors to rotate towards that direction. This causes an output impulse to be picked up by the digit selection conductor, the polarity of which is dependent upon the original state of remanent magnetisation of the thin film element, i.e. on whether digit "1" or "0" was stored thereby. Storage of a "1" or "0" digit is achieved by the application of an impulse to the digit selection conductor, the polarity of said impulse determining which remanent state of magnetisation is chosen.

In order that the thin film magnetic-alloy coating should have the desired characteristic of exhibiting uniaxial anisotropy various factors must be carefully controlled in the formation of said coating. One of these is that the composition of the chosen alloy should be carefully selected and maintained substantially constant throughout the coating. By way of example one suitable ferromagnetic alloy is a nickel-iron alloy having a composition of approximately 80% nickel to 20% iron, and this composition should be maintained throughout the coating within at most 1%.

A second factor which influences the above mentioned characteristic of the thin film coating is the presence of a magnetic field during deposition of the coating. The magnetic field is applied in the required direction of the easy axis of the coating.

A third factor which should be carefully controlled is the thickness of the coating since this influences the threshold fields of the hysteresis loop of the coating, the magnitude of which is important in memory applications. Moreover the thickness of the coating also influences the magnitude of the output signal derived when the magnetisation rotates in response to an impulse in the word selection conductor.

It is an object of this invention to provide an improved method and apparatus for manufacturing a logical device which comprises an elongated substrate incorporating a conductive path therealong, employing the controlled deposition of a thin film coating on said substrate by a continuous process of electrodeposition, with a view to controlling the properties of said thin film coating.

According to one feature of the invention there is provided a method of manufacturing an elongated coated conductor element for a logical device which comprises feeding an elongated substrate having a conductive path therealong through a plating bath containing an electrolytic solution and an anode electrode, employing said conductive path as a cathode electrode in a process of electrodepositing a thin film coating onto said substrate, measuring the voltage across the length of said conductive path in said bath, adjusting the position of said one electrode and/or the dimensions of said bath until said voltage attains a value indicative of a uniform plating current density along the substrate in the bath, and maintaining the temperature of the electrolyte uniform at least in the vicinity of the cathode electrode.

In order to obtain a uniform composition and thickness of a thin film coating deposited on an elongated substrate by a continuous process of deposition, the plating current density should be maintained uniform along the substrate and constant with time. Factors which affect the plating current density are the relative positions of the cathode and anode, and also the volume and shape of the plating bath. Thus, in accordance with said one feature of the invention, adjustment of these factors is made until a substantially uniform plating current density is achieved.

According to another feature of the invention there is provided a method of manufacturing a logical device comprising an elongated substrate having a conductive path therealong and a thin film coating of ferromagnetic material having uniaxial anisotropy deposited on said substrate, said method including forming said thin film coating by a continuous process of electrodeposition, employing said conductive path as an electrode in said process, and employing an A.C. current to produce an aligning magnetic field for inducing the preferred direction of magnetisation of said coating, the frequency of said A.C. aligning field being sufficiently high to have substantially no effect upon the plating current density in said electrodeposition process.

Conveniently the aligning field for inducing the preferred direction of magnetisation can be provided by a current passed along the conductive path of said substrate when said preferred direction, or easy axis, is required to be in a direction at right angles to the axis of said substrate. If a D.C. current is employed for this purpose it will set up a voltage gradient along the conductive path which will influence the plating current density. Accordingly an A.C. current is employed, setting up an A.C. aligning field, and the frequency of said A.C. current is arranged to be sufficiently high to have no substantial effect upon said plating current density.

According to yet another feature of the invention there is provided apparatus for manufacturing a logical device comprising an elongated substrate having a conductive path therealong and a thin film coating deposited on said substrate, said apparatus comprising a plating bath for containing an electrolytic solution and one electrode, arranged so that said elongated substrate can be continuously fed through said bath, whilst employing said conductive path as another electrode in a process of electrodepositing said thin film coating onto said substrate, a porous enclosure within said bath arranged so as to surround said substrate, one end of said enclosure communicating with the remainder of the interior of said bath, and heat exchanging means coupled at its input to said remainder of the interior of said bath and at its output to the other end of said porous enclosure.

The plating current density is also affected by thermal convection and other sources of agitation which may give rise to variations in the concentration of the electrolytic solution in the vicinity of the substrate. In order to maintain thermal equilibrium in said solution, i.e. to maintain said solution at a constant temperature throughout, it is necessary to provide some agitation of the solution, and hence this agitation should be uniformly performed to maintain a constant concentration of the solution in the vicinity of the substrate. If the plating bath containing the electrolytic solution is coupled to heat exchanging means and said solution pumped through said heat exchanging means in an attempt to maintain a constant temperature of said solution, it is found that it is difficult to obtain uniform flow conditions within the bath due to the fact that the dimensions of the bath have to be chosen with other factors in mind, and usually have cross sectional dimensions approximately equal to their lengths and hence very much greater than the cross sectional dimensions of the substrate. The provision of a porous enclosure within the bath which surrounds the substrate and communicates with the output side of the heat exchanger has the effect of enabling the electrolytic solution from the heat exchanger to follow a substantially uniform flow pattern along the substrate. However, since the enclosure is porous it presents a low electrical resistance and has substantially no effect on the uniformity of the current density in spite of the fact that said one electrode is disposed outside said porous container. Preferably the electrolytic solution from the heat exchanger is applied to the porous container via swirling means such as a series of helically orientated nozzles which cause the solution to flow along the container, and hence along the substrate with a helical motion.

Figure 2:
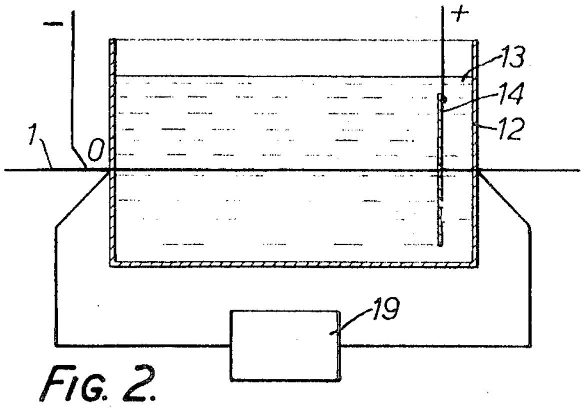
Figure 3:
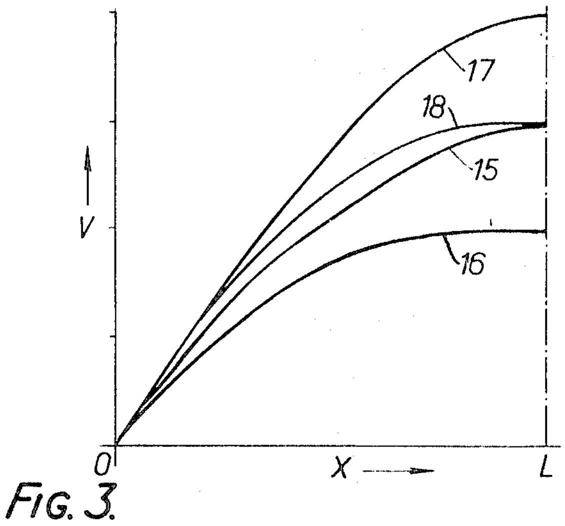
Figure 4:
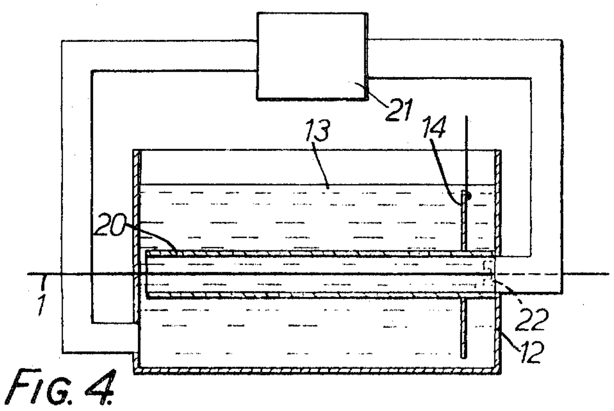

In order that the invention may be clearly understood and readily carried into effect it will now be more fully described with reference to the drawings accompanying the specification, in which:

FIG. 1 is a flow diagram representing a sequence of operations in a method of manufacturing a logical device comprising an elongated substrate having a conductive path therealong and a thin film coating deposited on said substrate, FIG. 2 shows partly in section and partly diagrammatically, apparatus for use in a step in the method diagrammatically represented in FIG. 1, FIG. 3 shows graphically the voltage distribution along a cathode in the apparatus of FIG. 2 under different circumstances, and FIG. 4 shows, also in section, a further development of the apparatus of FIG. 2.

The invention will be described, by way of example, as applied to the manufacture of logical devices in which said elongated substrate is a conducting wire, and said thin film coating is of ferromagnetic material.

In manufacturing a logical device comprising a conducting wire having a thin film ferromagnetic coating thereon a continuous method may be employed including the steps indicated diagrammatically in FIG. 1. In one particular example the wire may be a beryllium-copper wire, and this is indicated by reference 1 in FIG. 1. Alternatively, however, other suitable constructions of wire may be employed. The wire 1 is fed from a source, such as a spool 2, continuously through a series of operational stages in each of which a specific type of treatment of the wire is carried out. In the first stage 3 the wire is annealed by heating to a suitable temperature in a suitable atmosphere, and in the second stage 4 said wire 1 is given an anodic clean in a suitable solution. In the third stage 5 the wire is washed, preferably employing deionized water, and is then immersed in a suitable cleaner in stage 6. Subsequently, in stage 7, the wire 1 is passed through a plating bath which contains a suitable solution for plating the wire to fill any crevises therein. By way of example the wire 1 may be copper plated in this process. The wire 1 is then subjected to a second washing process in stage 8 and is then passed through a plating bath in stage 9 in which the aforesaid thin film ferromagnetic coating is deposited onto said wire 1. By way of example the electrolytic solution employed in the plating bath may be a suitable solution of nickel and iron sulphates, and the thin film coating deposited on the wire 1 may be a nickel-iron alloy having a composition of approximately 80% nickel and 20% iron. However, other suitable compositions of the thin film coating may be employed. After the plating process in stage 9, the coated wire 1 is washed in stage 10 and finally tested in stage 11. The testing process may include subjecting the coated wire 1 to a pulling and/or twisting action, in order to test the effectiveness of the deposition of the thin film ferromagnetic coating.

The invention is especially concerned with the plating process of stage 9 and reference will now be made to FIG. 2 which shows in section a plating bath 12 for use in said plating process. The plating bath 12 contains an electrolytic solution 13, for example of nickel and iron sulphates as hereinbefore described, and one electrode, which in this embodiment is to be employed as an anode 14 in a process of electrodeposition. The wire 1 is fed continuously through the plating bath 12 in its axial direction, which in this embodiment is arranged to be orthogonal to the anode 14. The wire 1 is connected at point O as the cathode in the process of electrodeposition of a thin film ferromagnetic coating on said wire 1.

In order to obtain a substantially uniform composition of the coating deposited on the wire 1 it is desired that the plating current density should be maintained as uniform as possible over the length of the wire 1 in the bath 12 and also should be maintained constant with time. The plating current density is primarily dependent upon the relative voltages of the anode 14 and the cathode, or wire 1. However, the plating current density can vary from point to point along the cathode, on which the coating is being deposited, and one factor which will cause such variation is an appreciable electrical resistance of said cathode which will cause the voltage along the cathode to vary. If the cross section of the cathode is uniform along its length, then the voltage at any point of its length, for a given distribution of plating current density, can be calculated. For example in the case of a uniform cylindrical wire 1 having a length L within the plating bath 12, and a resistance per unit length of $k$, the voltage $V_x$ at a distance $x$ along the wire 1 from the end thereof at zero voltage is given by the following formula:

$$V_X = k i_T \left( L - \frac{x^2}{2L} \right)$$

where $i_T$ is the total plating current and the plating current density is assumed to be uniform along the wire 1. FIG. 3 shows the relationship between the cathode voltage V and the distance $x$ along the cathode from the zero voltage and for different distributions of the plating current density. Thus 15 indicates said relationship for a uniform current density distribution along the wire 1, as represented by the above formula. References 16, 17 and 18, however, indicate said relationship for variable current density distributions respectively given by the formulae $$\sigma_1 = \sigma_0 \left( 1 - \frac{x}{L} \right), \quad \sigma_1 = \frac{x}{L} \sigma_0$$

and $$\sigma_1 = \sigma_0 \sin \frac{\pi x}{L}$$

where $\sigma$ is the plating current density, and $x$ is the distance along the wire 1 from the end thereof at zero voltage. Thus $\sigma_0$ is the current density at said end, and $\sigma_1$ is the current density at distance L therefrom.

From the formula for the voltage $V_x$ at position $x$ along the wire 1 given above it can be seen that if the plating current density is uniform along the wire 1 then the voltage across the total length L of said wire 1 in the plating bath 12, i.e. voltage $V_L$, is given by the formula:

$$V_L = k i_T \left( L - \frac{L^2}{2L} \right) \text{ or } V_L = \frac{k i_T L}{2}$$

Thus in accordance with an embodiment of one feature of the invention the voltage $V_L$ is measured and different positions of the anode 14, and different shapes and volumes of the plating bath 11 employed until the voltage $V_L$ across the wire 1 is equal to one half of the product of $k i_T L$. For this purpose a voltmeter 19 is connected across said length L of the wire 1 to indicate the voltage $V_L$.

The magnitude of $$V_L = \frac{k i_T L}{2}$$

is in fact not unique to a condition of uniform plating current density distribution. If the current density distribution is symmetrical about the centre point of the wire 1 in the bath 12 then the same value of the voltage $V_L$ is obtained. This is evident from FIG. 3 from which it can be seen that the relationship indicated by reference 18 intersects that indicated by reference 15 at L. As can be seen from FIG. 3 the maximum difference between the two graph lines 15 and 18 occurs substantially at position $L/2$ along the wire. Hence the voltage at this position can be measured to distinguish betwen the two cases. In practise, however, it is possible to distinguish between the two cases by reasons of consideration of the position of the anode 14.

It has been found in one particular practical embodiment that the anode 14 should be in a plane orthogonal to the axis of the wire 1 at a distance of from 0.8L and L from the zero voltage end of said wire. Moreover it has been found that suitable dimensions of the plating bath 12 in the anode plane are similar to the length L. The position of the anode 14 in the anode plane, the size of said anode 14 and its orientation within the plane are determined having regard to the plating current, conductivity of the electrolytic solution and other factors and can be adjusted as desired. The cross section of the plating bath 12 in the anode plane need not be circularly symmetrical, and moreover the cross section of said bath 12 need not be of constant area along the length L.

During the process of electrodeposition of the thin film coating on the wire 1 the particular arrangement derived as giving the required value of $V_L$ is maintained for the particular wire 1 being employed. When a further wire of different diameter and/or resistivity is employed in the apparatus, however, the measurement of voltage $V_L$ is again made and suitable further adjustments effected in the position of the anode 14 and/or the dimensions of the plating bath 12 until the required value of voltage $V_L$ is attained.

Whilst the thin film coating is being deposited on the wire 1, in order to establish a preferred direction of magnetisation or easy axis of said coating, the deposition is arranged to take place in the presence of a magnetic field in said preferred direction, i.e. parallel to the required easy axis. In one specific embodiment it is required that the easy axis should lie in a circumferential direction of said coating at right angles to the axis of the wire 1, and to achieve this a current may be passed through the wire 1 during the plating process to set up a magnetic field in this direction. If a D.C. current is employed for this purpose, however, it will set up a voltage gradient along the wire 1 and hence upset the condition of a substantially uniform plating current which may have been established by the method hereinbefore described. The magnitude of the voltage gradient along the wire 1 will, of course, be dependent upon the length L of said wire 1 in the bath 12. Hence by making the length L very short said voltage gradient can be made small, but this imposes a disadvantageous limitation on the design of the plating bath 12. Accordingly, instead of employing a D.C. aligning field, an A.C. aligning field is employed, an A.C. current being applied, in this embodiment to the wire 1. The frequency of the A.C. aligning field is chosen to be sufficiently high to have substantially no effect upon the plating current density. This is possible to achieve since the plating current density follows potential variations with a finite time constant. In order to determine the frequency at which this condition is reached an A.C. aligning current of variable frequency may be applied to the wire 1 before switching on the plating current, and the normal resistive potential variations of the wire 1 can be corrected. The plating current is then switched on and if the frequency of the A.C. aligning current is sufficiently low to produce voltage changes across the wire 1 in the bath 12 at said A.C. frequency, then said frequency is increased until such voltage changes disappear. The voltage changes may be observed by employing the voltmeter 19 shown in FIG. 2.

Apart from the relative dispositions of the anode and cathode and the dimensions of the plating bath 12, other factors may effect the plating current density distribution in the bath 11 along the wire 1. For example, thermal convection and other sources of agitation may give rise to variations in the concentration of the electrolytic solution 13 in the vicinity of the wire 1. Hence preferably the solution 13 is agitated in a uniform way to substantially maintain thermal equilibrium in the solution, i.e. to maintain said solution 13 at a substantially constant temperature throughout at least the vicinity of the wire 1. For this purpose the electrolytic solution 13 may be pumped from the bath 1 through a heat exchanger and back to the bath 1 at a controlled temperature. However even when this is done it is difficult to obtain uniform flow conditions within a bath having dimensions which are suitable for other reasons, for example in a bath of which the cross sectional dimensions are approximately equal to the length of the bath, namely the length L. Substantially uniform flow conditions along the wire 1 may, however, be achieved by employing the arrangement of FIG. 4. In this arrangement a porous enclosure 20, which in this embodiment is a cylindrical tube and may, for example, be made of porous plastics material, is disposed within the bath 12 and arranged so as to surround the wire 1 sufficiently closely to enable a substantially uniform flow pattern to be set up within said porous enclosure 20 around the wire 1. At one end the porous enclosure 20 communicates with the remainder of the interior of the bath 12 and at the other end said porous enclosure communicates with the output side of a heat exchanger 21, the input side of which is coupled to said remainder of the interior of the bath 12. The anode 14 is disposed outside of the porous enclosure 20 as shown in FIG. 4, but since said enclosure 20 is porous it presents a low electrical resistance and has substantially no effect upon the uniformity of the current density even though the anode 14 is disposed outside of the enclosure.

In a preferred embodiment the output from the heat exchanger 21 is coupled to the input to the porous enclosure 20 via series of helically orientated nozzles which cause the solution from the heat exchanger 21 to flow along the enclosure 20 and thus around the wire 1 with a helical motion which is substantially uniform along the length of said wire 1. The positions of these nozzles are indicated by the dotted line 22 in FIG. 4.

Although the invention has been especially described with reference to specific embodiments thereof various modifications may be made to the method and apparatus described without departing from the scope of the invention. For example, the cylindrical wire 1 may be replaced by another form of elongated substrate, such as a hollow cylindrical substrate or a strip like substrate. Moreover suitable sequences of processing the elongated substrate other than that described with reference to FIG. 1, and other compositions of the elongated substrate and the thin film coating may be employed provided that these are suitable for use in a logical device.

What we claim is:

1. A method of manufacturing an elongated coated element for a logical device, which comprises feeding an elongated substrate having a conductive path therealong through a plating bath containing an electrolytic solution and an anode electrode, employing said substrate as a cathode electrode in a process of electrodepositing a thin-film coating of a metal alloy onto said substrate, the anode being spaced by more than half the immersed length of the substrate from the zero-voltage point of said immersed length, and the cathode being connected to a source of D.C. voltage at said zero voltage point, the position of said anode relative to the cathode and the dimensions of said bath being so selected that the voltage across the length of said conductive path in said bath has a value substantially equal to one half of the product $ki_T L$, wherein $k$ is the resistance of the substrate per unit length, $i_T$ is the total plating current, and L is said length of the conductive path in the bath, and controlling the temperature of the electrolyte at least in the vicinity of the cathode electrode.

2. A method as claimed in claim 1, in which an alternating current is used in the plating bath for establishing a preferred direction of magnetisation in the deposited coating.

3. A method as claimed in claim 1 in which the electrolytic solution is a solution of nickel and iron sulphates.

4. A method as claimed in claim 1, wherein liquid from said bath is circulated through a heat exchanger and passed, following the latter, through an elongated porous sleeve which encircles the cathode electrode between said cathode electrode and said anode electrode and extends within the bath from one end of the cathode electrode to the vicinity of the other end thereof, and which communicates with the remainder of the bath adjacent to said other end of the cathode electrode, while, except for its porosity, isolating up to such point of communication the bath liquid which has passed through the heat exchanger from said remainder of the bath said sleeve having a diameter which is small compared to the dimensions of the bath in a direction transversely to the length of said elongated coated element so as to maintain a uniform temperature of the electrolyte in the vicinity of said cathode electrode while producing minimum interference with the flow of the plating current between the said anode and cathode electrodes.

5. A method as claimed in claim 4, wherein the electrolyte from said heat exchanger is returned to the interior of said sleeve in such a manner as to move towards said other end with a swirling motion.

6. A method of manufacturing a coated wire element for a logical device, which comprises feeding a conductive wire having a conductive path therealong through a plating bath containing an electrolytic solution and an anode electrode, employing said conductive wire as a cathode electrode in a process of electrodepositing a thin film coating of magnetisable alloy material on said wire, the dimensions defining the bath, the anode being spaced by more than half the immersed length of the substrate from the zero-voltage point of said immersed length, and the cathode being connected to a source of D.C. voltage at said zero voltage point, the position of said one electrode being so selected that the voltage across the length of said wire in said bath attains a value substantially equal to one half of the product $ki_T L$, wherein $k$ is the resistance of the substrate per unit length, $i_T$ is the total plating current, and L is said length of the conductive path in the bath, and controlling the temperature of the electrolyte at least in the vicinity of the cathode electrode.

7. A method as claimed in claim 6, wherein magnetic orientation of the coating is achieved by passing along the cathode electrode an alternating current of a frequency sufficiently high to have no substantial effect upon the electrodeposition process.

References Cited

UNITED STATES PATENTS

| | | | |
|---|---|---|---|
| 3,027,309 | 3/1962 | Stephen | 204—43 |
| 3,189,532 | 6/1965 | Chow et al. | 204—28 |
| 3,272,727 | 9/1966 | Schmeckenbecher | 204—43 |
| 3,441,494 | 4/1969 | Oshima et al. | 204—28 |

FOREIGN PATENTS

| | | |
|---|---|---|
| 3,826,074 | 1963 | Japan. |
| 220,904 | 1961 | Austria. |

OTHER REFERENCES

Production of Nickel-Iron Alloys by S. S. Misra et al., Metal Finishing, May 1967, pp. 62–67.

JOHN H. MACK, Primary Examiner

T. TUFARIELLO, Assistant Examiner

U.S. Cl. X.R.

204—43, 211, 275